United States Patent
Pruchniak

[11] Patent Number: 6,075,518
[45] Date of Patent: Jun. 13, 2000

[54] ROTATIONAL X-AXIS POINTING DEVICE

[75] Inventor: Wayne M. Pruchniak, Sioux City, Iowa

[73] Assignee: Gateway 2000, Inc., North Sioux City, S. Dak.

[21] Appl. No.: 08/892,809

[22] Filed: Jul. 15, 1997

[51] Int. Cl.[7] .................................................. G09G 5/08
[52] U.S. Cl. .......................... 345/157; 345/163; 345/168; 345/184
[58] Field of Search ................................ 345/156, 157, 345/161, 163, 168, 184, 145, 974, 158, 160, 167; 74/471; 341/22, 35; 200/11 TW; 273/148 B; 463/38

[56] References Cited

U.S. PATENT DOCUMENTS

| | | | |
|---|---|---|---|
| 4,794,388 | 12/1988 | Matthews | 345/161 |
| 4,910,503 | 3/1990 | Brodsky | 345/181 |
| 4,982,618 | 1/1991 | Culver | 74/471 |
| 5,126,723 | 6/1992 | Long et al. | 345/168 |
| 5,160,919 | 11/1992 | Mohler et al. | 345/168 |
| 5,298,919 | 3/1994 | Chang | 345/163 |
| 5,440,325 | 8/1995 | Edmark, III | 345/184 |
| 5,440,326 | 8/1995 | Quinn | 345/156 |
| 5,442,377 | 8/1995 | Rowe | 345/165 |
| 5,463,409 | 10/1995 | Gilbert | 345/167 |
| 5,473,344 | 12/1995 | Bacon et al. | 345/163 |
| 5,477,237 | 12/1995 | Parks | 345/156 |
| 5,510,810 | 4/1996 | Nishijima et al. | 345/156 |
| 5,530,455 | 6/1996 | Gillick et al. | 345/163 |
| 5,563,629 | 10/1996 | Caprara | 345/160 |
| 5,565,890 | 10/1996 | Wu et al. | 345/165 |
| 5,675,360 | 10/1997 | Takegoshi et al. | 345/167 |
| 5,749,577 | 5/1998 | Couch et al. | 463/38 |
| 5,790,101 | 8/1998 | Schoch et al. | 345/184 |
| 5,847,694 | 12/1998 | Redford et al. | 345/158 |
| 5,912,661 | 6/1999 | Siddiqui | 345/157 |

OTHER PUBLICATIONS

"Microsoft Announces Microsoft IntelliMouse", PR Newswire, PCN—The PointCast Network, 2 pages (Jul. 22, 1996).

Primary Examiner—Dennis-Doon Chow
Attorney, Agent, or Firm—Schwegman, Lundberg, Woessner & Kluth, P.A.; Anthony Claiborne

[57] ABSTRACT

A pointing device provides a rotating member for rotatably adjusting a location of a cursor, a volume level, display settings, or other variables. The pointing device includes a control arm which a user can manipulate to make a button selection. The pointing device combines the button selection and rotational adjustment into a single apparatus. The device is sized to be comfortably used by one hand, and can be mounted within a mouse, a keyboard, or a monitor. The pointing device can be used alone, or can be used to augment a mouse, a trackball, or a touchpad.

20 Claims, 3 Drawing Sheets

ROTATIONAL X-AXIS POINTING DEVICE

FIELD OF THE INVENTION

The present invention relates generally to computers. More particularly, it pertains to pointing devices for use with computers.

BACKGROUND OF THE INVENTION

A number of computer screen cursor or pointing control devices have been developed in recent years which allow the user of a device to selectively position the cursor in use at any X,Y coordinate pair on a computer screen or plotting device or any such graphical display.

The central feature of previously available trackball-type mechanisms is the use of an individual sphere which is supported on bearings permitting rotation of the sphere in any direction about a central point. Motion detection devices are biased against the sphere which permit detection of sphere movement. The detected sphere movement is converted into X-axis and Y-axis components which are then utilized to reposition a cursor.

It has also been typical of this art to invert the trackball mechanism permitting the sphere to be suspended from the bottom of a housing. The sphere or trackball is then rotated by movement of the housing about a suitable surface capable of providing frictional contact with the trackball. Movement of the housing then generates movement of the trackball which is then converted into X-axis and Y-axis components utilized to reposition the cursor on the computer screen. This form of trackball control device is typically referred to as a mouse.

The trackball-type device and the mouse-type device present a number of problems to computer users. The mouse-type control device presents the drawback of requiring a surface of adequate size to permit movement of the mouse about an area sufficient to direct the cursor into all areas of the computer screen. If the space available is of insufficient size it is necessary to lift the mouse from the surface and reposition it in order to continue to move the mouse in the selected direction to achieve complete movement of the cursor or pointer across the entirety of the computer screen or plotter device. The unavailability of such sufficient surface area during travel has prompted increased use of the trackball-type device with computers.

Another type of conventional screen display control apparatus only controls adjustment by the direction in which an adjustment lever is tilted. When different kinds of functions are to be controlled, an adjustment member other than the adjustment lever must be operated. The adjustment lever must be spaced apart from the other adjustment member to a certain extent due to the restriction resulting from an operating space and design. As a result, operators must move their hands and fingers in a complicated manner to continuously control a plurality of kinds of functions.

Another approach to pointing devices is the IntelliMouse, made by Microsoft, Inc. The IntelliMouse is an inverted trackball arrangement as discussed above. In addition a clicking wheel is providing for scrolling up and down. However, the clicking wheel of the IntelliMouse is limited to a scrolling mechanism.

Technology and its resulting software development is becoming more and more sophisticated. Computer storage continues to increase, thereby permitting larger, more powerful software programs. The number of parameters has risen, and the method of selection has become more complex. Consequently, the range and capability of selection devices must simultaneously become more sophisticated.

Accordingly, what is needed is a single device capable of selection adjustment. What is further needed is a device which can accommodate more complex software programs.

SUMMARY OF THE INVENTION

A rotational pointing device is provided comprising a support arm pivotally mounted for pivoting about a fulcrum point. The device has actuating assemblies proximate to the end of the support arm. In one embodiment, the actuating assemblies comprise a set of micro switches. A rotating member, having a slip resistant surface on its outer perimeter edge, is mounted on one end of a control arm. The control arm extends from the fulcrum point to the axis of the rotating member. A position sensor is mounted near the rotating member, and monitors the amount of rotation of the rotating member. The position sensor includes an LED coupled with a photo diode. The LED and photo diode are oppositely disposed with the rotating member in between. The rotating member has holes which alternate blocking and passing light during movement of the rotating member. Computer users can move or adjust a cursor or a value of a parameter by rotating the rotating member. The user can also make a selection by tilting the control arm such that actuating members contact the micro switches.

The pointing device also has resilient members disposed near the support arm for returning the pointing device to a neutral position after actuation. In one embodiment, the resilient members are helical springs disposed beneath the support arm.

The pointing device can be used exclusively for a pointing and selection device. In another embodiment, the device can be used in conjunction with other conventional pointing devices, such as a mouse or a trackball. The pointing device can be mounted within a mouse, a keyboard, a portable computer, a monitor, or other devices.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope of the present invention is defined by the appended claims.

The present invention provides a rotational pointing device having integral selection capabilities. The pointing device can be used in conjunction with known mouse or trackball devices. Alternatively, the pointing device can be used exclusively on a monitor, a keyboard, or a portable computer.

Figure 1:
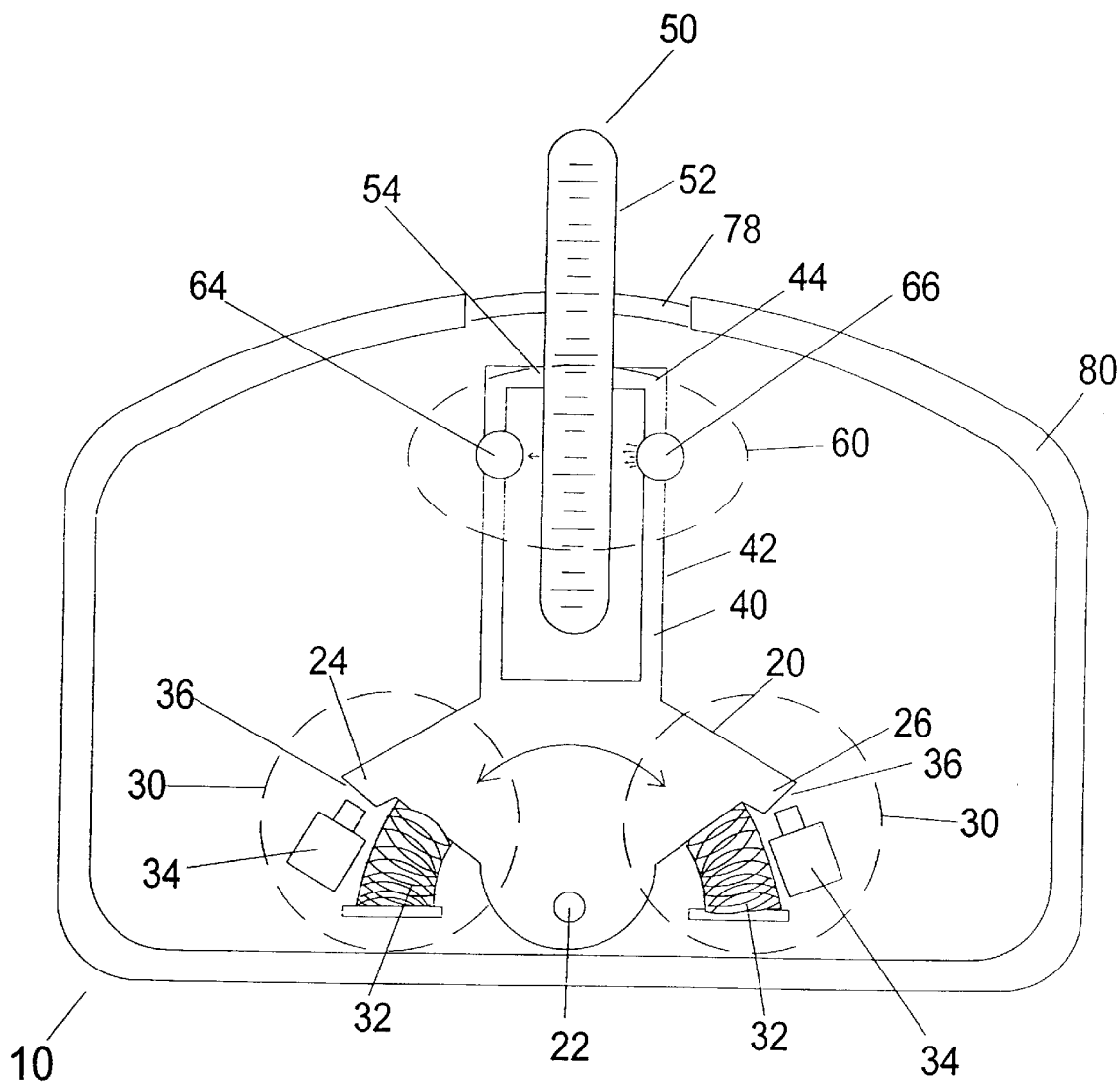
FIG. 1 is a first side elevational view illustrating a pointing device constructed in accordance with one embodiment of the present invention.

One embodiment of the pointing device is shown in FIG. 1. Generally, the pointing device 10 is comprised of a support arm 20, actuating assemblies 30, a control arm 40, a rotating member 50, and a position sensor 60. More particularly, the support arm 20, in one embodiment, has a generally triangular shape, with a first end 24 and a second end 26. However, other shapes are within the scope of the invention. For instance, the support arm could be fabricated in an elongate structure.

A generally center point of the support arm 20 is rotatably mounted at a fulcrum point 22 such that the support arm 20 rotates over the fulcrum point 22. Disposed on the first and second ends 24, 26 of the support arm 20 are actuating assemblies 30. The actuating assemblies 30 sense the pivotal movement of the support arm 20 and permit a user to select a predetermined option shown on a computer screen or similar device. The actuating assemblies 30 have resilient members 32 disposed thereunder for returning the support arm 20 to a neutral position relative to a base surface. In one embodiment, the resilient members 32 are helical springs, although other devices providing a return mechanism to the support arm 20 could be used. Alternatively, one resilient member could be disposed at the fulcrum point 22 for returning the support arm to the neutral position.

In another embodiment, the actuating assemblies 30 disposed on the first and second ends 24, 26 of the support arm 20 are actuating members 36. Proximate to the actuating members 36 are micro switches 34. One example of micro switches 34 for use with the invention is manufactured by Digikey, Part No. SW505-ND, although equivalent types of switches could also be used. When the support arm 20 is pivoted a desired amount about the fulcrum point 22, the actuating members 36 mechanically activate the micro switches 34. The helical springs 32, the micro switches and respective actuating members 34, 36 are positioned and sized such that the helical springs 32 do not interfere with the contact of the switches and actuating members 34, 36.

The control arm 40 extends away from the fulcrum point 22 of the support arm 20. At a distal end 44 of the control arm 40, the rotating member 50 is rotatably mounted at its axis 54. In one embodiment, the control arm 40 has a pronged portion 42 and the rotating member 50 is mounted therein. The pronged portion 42 extends to a length sufficient to permit full movement of the rotating member 50 about its axis 54.

The rotating member 50 is generally formed in a thin disc shape, although other shapes are contemplated by the scope of the invention. In another embodiment, the rotating member 50 is a wheel component having a rubber material disposed on an outer perimeter edge surface of the wheel component 52. Alternatively, the rotating member is provided with other types of slip resistant surfaces, such as a knurled or grooved surface.

The rotating member 50 has a position sensor 60 mounted proximate to the rotating member 50, such that the amount of revolution can thereby be monitored. The position sensor detects the rotation of the rotating member and converts the measurement to an electrical signal. The signal is then communicated to a computer.

Figure 2:
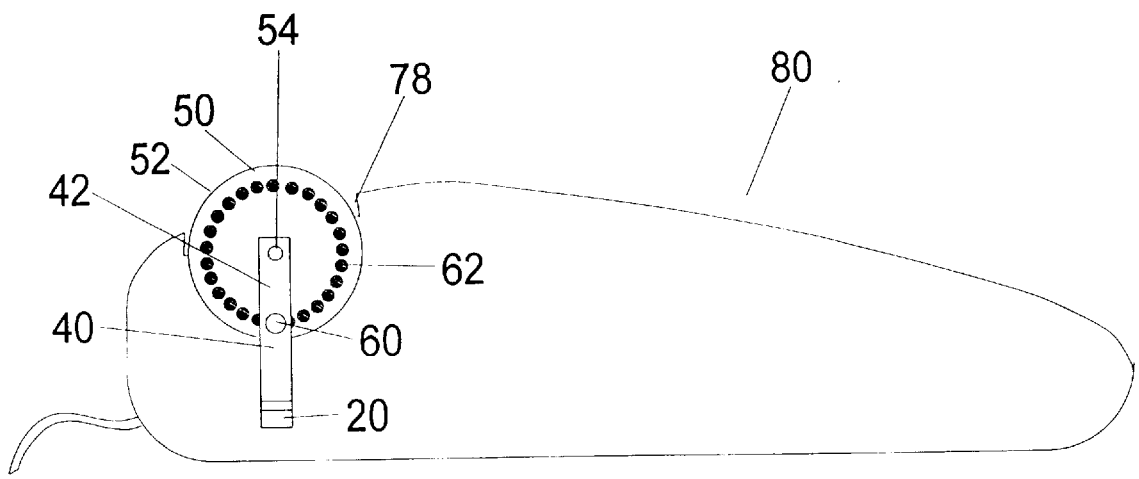
FIG. 2 is a second side elevational view illustrating a pointing device constructed in accordance with the present invention.

The position sensor 60, in one embodiment, is comprised in part of a light-detecting element, such as a photo diode 64. The position sensor 60 is also comprised of a light-emitting element, such as an LED 66. As shown in FIG. 2, the rotating member 50 has a plurality of apertures 62 therein. The apertures 62 are spaced substantially equally apart around the axis 54 of the rotating member 50. The LED 66 is positioned in line with the rotating member 50 on a first side, proximate to the apertures 62. The photo diode 64 is mounted on a second side of the rotating member 50 near the apertures 62, and is also positioned towards the rotating member 50. The LED emits a light towards the rotating member 50, and when separated by an aperture, the photo diode 64 receives the light emitted by the LED. Although a photo diode and LED have been described as one embodiment of the position sensor 60, other detection mechanisms are known in the art and are contemplated by the scope of the invention. The position sensor 60 need only be responsive to the plurality of apertures 62, or other types of indicia in order to track movement of the rotating member 50. For instance, rotating member 50 could be coupled with a magnetic coil sensor, which detects rotation of the rotating member 50.

Figure 3:
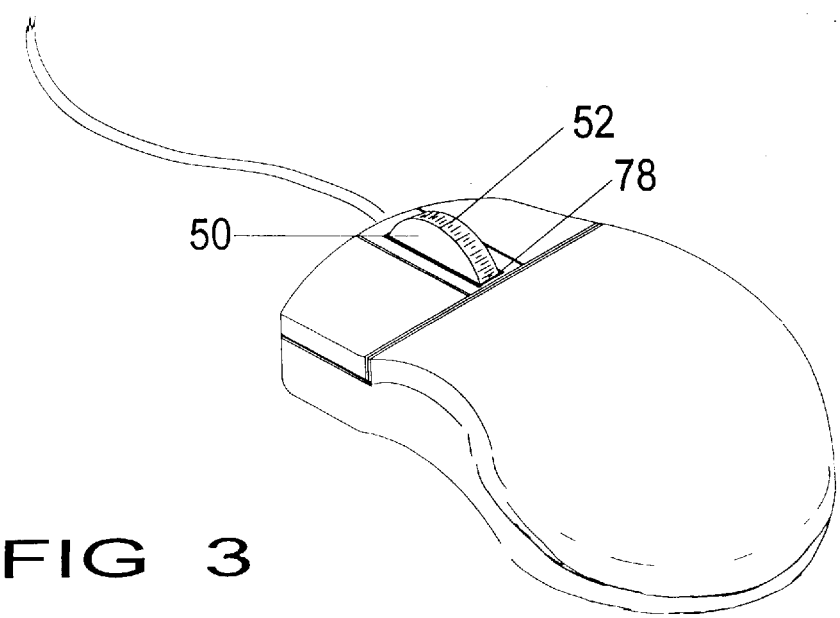
FIG. 3 is top plan view illustrating a pointing device constructed in accordance with one embodiment of the present invention.

The rotational pointing device 10 is mounted in a housing 80. As illustrated in FIG. 3, the housing 80 has a cut out 78 for receiving the rotating member 50. The rotating member 50 extends through the housing 80, as shown in FIG. 2, sufficient to permit manipulation by hand. The length of the cut out 78 is sized such that the rotating member 50 can be revolved about its axis unobstructed by the housing 80. The width of the cut out 78 is sized such that the control arm 40 can be tilted over the fulcrum point 22, and the respective micro switches can make contact without interference from the housing 80.

Figure 4:
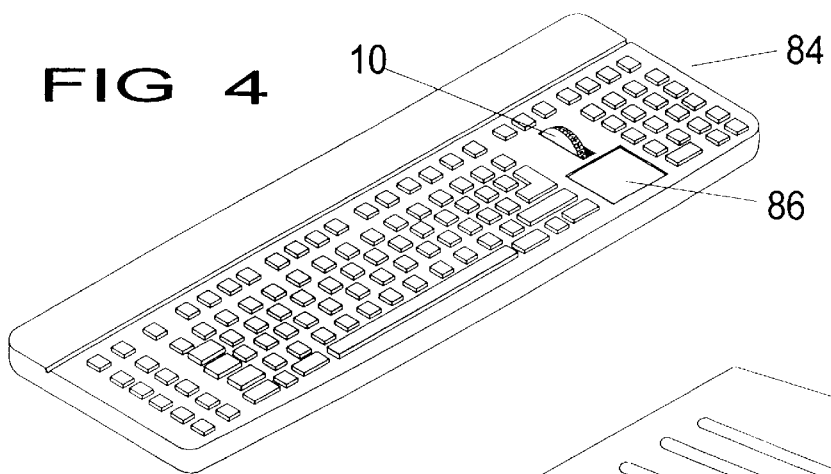
FIG. 4 is a perspective view illustrating one embodiment of the pointing device housed in a keyboard.
Figure 5:
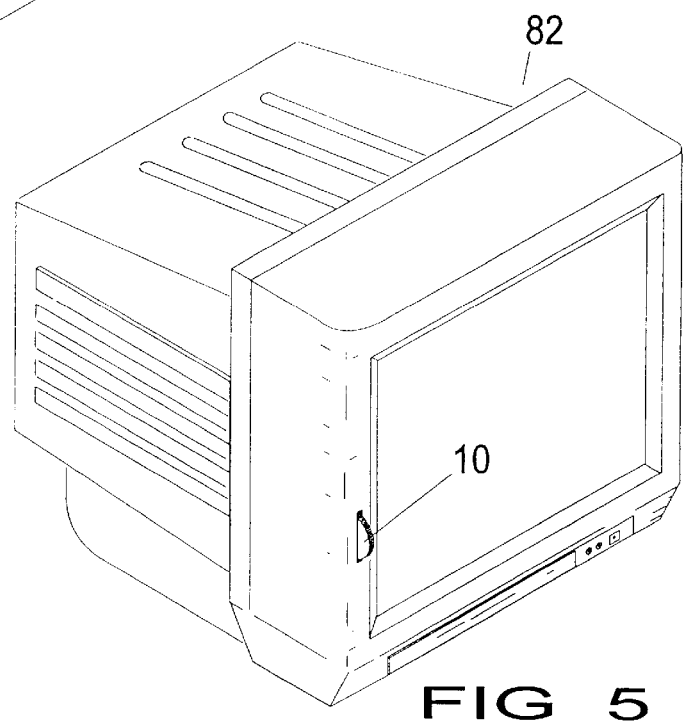
FIG. 5 is a perspective view illustrating one embodiment of the pointing device housed in a portable computer.
Figure 6:
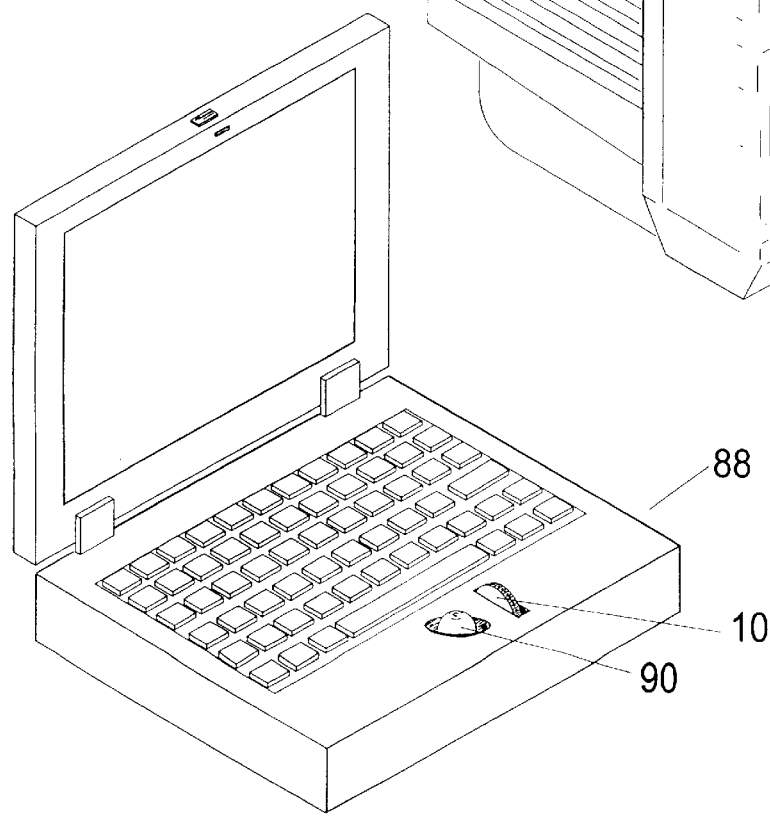
FIG. 6 is a perspective view illustrating one embodiment of the pointing device housed in a monitor.

The rotational pointing device 10 can also be mounted in other devices or other types of housings. As shown in FIG. 4, the pointing device 10 is mounted in a keyboard 84. In one embodiment, the device can by utilized in conjunction with a touchpad 86 for providing additional control. In another embodiment as shown in FIG. 5, the pointing device is mounted in a monitor 82. In yet another embodiment, illustrated in FIG. 6, the pointing device 10 is mounted in a portable computer 88 for use in conjunction with a trackball 90.

During operation, a user places a hand over the pointing device when modification or selection is desired. Irrespective of the type of mounting, the user rotates the rotating member for adjusting a level or scrolling through documents and the like. As the rotating member 50 rotates, light from the LED 66 is alternatively blocked and transmitted through the rotating member 50 and received by the photo diode 64 depending on whether one of the plurality of apertures 62 separates the LED 66 and the photo diode 64.

When a user desires to make a selection, the user tilts the control arm 40 using the portion of the rotating member 50 extending from the particular housing 80. The support arm 20 is then tilted in the direction selected by the user, and one of the actuating members 36 actuates one of the micro switches 34. When the rotating member 50 is released, the corresponding resilient member, or helical spring 32, returns the control arm automatically to a neutral position.

If a user wishes to click-and-drag, a term known by those skilled in the art, the user tilts the control arm 40 using the rotating member 50 as described above. While holding the rotating member 50 in a tilted position, the user rotates the rotating member 50 to select the desired amount. The user then releases the rotating member 50, which then returns to a neutral position.

The present invention advantageously provides a pointing device which operates from a fixed location, and avoids the need to move the control device location to bring about movement to the cursor. The device controls cursor movement or level control and button actuation in a single user control. Furthermore, the device can augment or replace conventional navigational aids. Integrated into a mouse-type housing, a keyboard, a portable computer, or a monitor, the device is comfortable for single-handed use by a user.

The device would provide additional navigation methods for users and can be used with various on-screen displays. For instance, the pointing device could be used for browsing the internet or scrolling within web sites. In word processing software, the wheel rotation could be used to scroll up or down a document. The pointing device could also be used as a volume mixer where the wheel rotation adjusts the volume level of master or secondary volumes after selection by the control arm. For menus, the pointing device could be used to navigate a system of cascading control menus for any application.

A user could change the behavior of the pointing device within a graphical or other type of interface, or disable the device. Since the apparatus can be used in combination with other devices, such as a trackball, a mouse, or a touch pad, the apparatus can also accommodate the increased sophistication of selections provided in present and future software programs.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A rotational pointing device comprising:
    a support arm having a first end and a second end, the support arm pivotally mounted for rotating about a fulcrum in a single dimension parallel to the support arm;
    actuating assemblies disposed proximate to both the first and second ends of the support arm;
    a control arm extending from the support arm at the fulcrum of the support arm to a distal end;
    a rotating member for rotating about an axis, the rotating member rotatably mounted at the distal end of the control arm such that the rotating member rotates in a single dimension that is substantially perpendicular to the dimension of the support arm rotation and is movable to cause rotation of the support arm and actuate the actuating assemblies when force is applied to the rotating member in a direction substantially parallel to the support arm; and
    a position sensor mounted on said control arm proximate to the rotating member, the position sensor for determining the amount of rotation of the rotating member.

2. The rotational pointing device as recited in claim 1, wherein the actuating assemblies have resilient members therein such that the pointing device is returned to an original position after the support arm is pivoted to actuate one of the actuating assemblies.

3. The rotational pointing device as recited in claim 2, wherein the resilient members are coil springs mounted below the first and second ends of the support arm.

4. The rotational pointing device as recited in claim 1, wherein the rotating member comprises a wheel component.

5. The rotational pointing device as recited in claim 1, wherein an outer perimeter edge surface of the rotating member comprises a slip resistant surface.

6. The rotational pointing device as recited in claim 5, wherein the slip resistant surface of the outer perimeter edge surface comprises rubber material.

7. The rotational pointing device as recited in claim 5, wherein the outer perimeter edge surface of the wheel component has a knurled surface.

8. The rotational pointing device as recited in claim 5, wherein the outer perimeter edge surface of the wheel component has a grooved surface.

9. The pointing device as recited in claim 1, wherein said pointing device is inserted in to a housing suitable to be manipulated with one hand, said pointing device positioned within the housing such that the rotating member extends out from said housing where the rotating member can be actuated with fingers of the same hand.

10. The pointing device as recited in claim 1, wherein said pointing device is coupled to a computer monitor, said pointing device positioned partially within the computer monitor such that the rotating member extends out from said computer monitor.

11. The pointing device as recited in claim 1, wherein said pointing device is coupled to a keyboard, said pointing device positioned partially within the keyboard such that the rotating member extends out from said keyboard.

12. The pointing device as recited in claim 1, wherein said position sensor comprises an LED mounted across from a photo diode with the rotating member therebetween, the rotating member having a plurality of holes therein for alternately transmitting and blocking light from the LED to the photo diode thereby detecting rotation of the rotating member.

13. The pointing device as recited in claim 1, wherein said pointing device is coupled to a portable computer, said pointing device positioned partially within the portable computer such that the rotating member extends out from said portable computer.

14. The pointing device as recited in claim 13, wherein the portable computer includes a trackball device disposed proximate to the pointing device.

15. A rotational pointing device comprising:
    a circuit board;
    a support arm pivotally connected with the circuit board; the support arm having a first end and a second end, the support arm pivotally mounted for rotating about a fulcrum in a single dimension parallel to the support arm;
    actuating members disposed on both first and second ends of the support arm;
    a control arm disposed in a generally perpendicular relationship to the support arm, the control arm extending from the fulcrum of the support arm to an end;

a wheel component rotatably mounted for rotating about an axis, the wheel component disposed at an angle to the circuit board, the wheel component connected to the end of the control arm at the wheel component axis, such that the wheel component rotates in a single dimension that is substantially perpendicular to the dimension of the support arm rotation and is movable to cause rotation of the support arm and actuate the actuating members when force is applied to the wheel component in a direction substantially parallel to the support arm;

a position sensor mounted on said control arm proximate to the wheel component, the position sensor for determining rotation of the wheel component and generating a rotation value therefrom;

a switching mechanism disposed beneath each actuating member; and resilient members disposed between the support arm actuating member and the switching mechanisms.

16. The pointing device as recited in claim 15, wherein the switching mechanisms comprise micro switches.

17. A pointing device as recited in claim 15, wherein the resilient members are helical springs.

18. The pointing device as recited in claim 15, wherein said pointing device is inserted into a housing suitable to be manipulated with one hand, said pointing device positioned within the housing such that the rotating member extends out from said housing such that the rotating member can be actuated with fingers of the same hand.

19. The pointing device as recited in claim 15, wherein said control arm comprises a pronged portion at one end, the wheel component being mounted at the axis of the wheel component within the pronged portion.

20. The pointing device as recited in claim 15, wherein the resilient members are non-conductive.

* * * * *